March 13, 1945.  J. A. HOPWOOD  2,371,296
MEANS FOR VENTING MILK CANS
Filed June 2, 1943  2 Sheets-Sheet 1

INVENTOR
JOHN A. HOPWOOD
BY
ATTORNEY

March 13, 1945.  J. A. HOPWOOD  2,371,296
MEANS FOR VENTING MILK CANS
Filed June 2, 1943  2 Sheets-Sheet 2
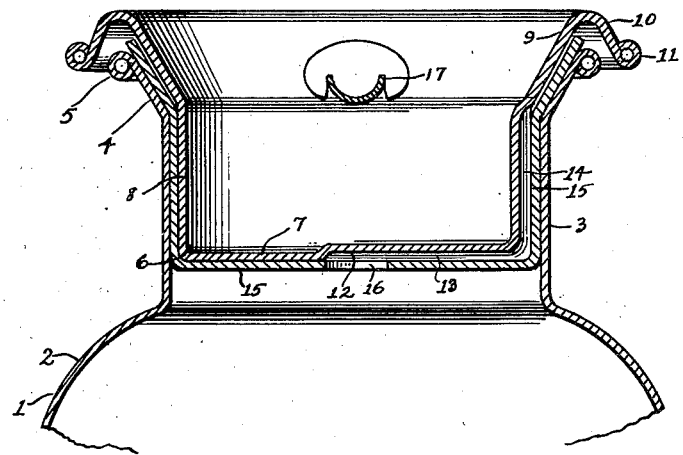
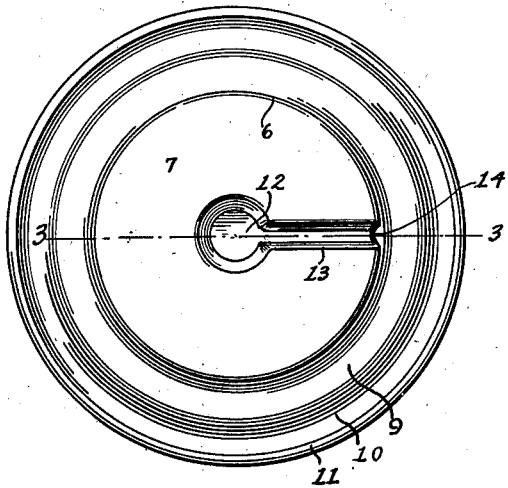
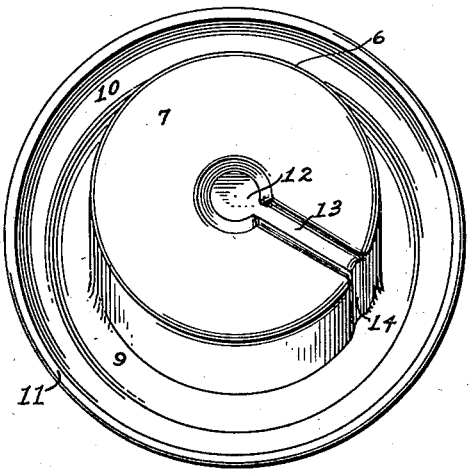
INVENTOR
JOHN A. HOPWOOD
BY
ATTORNEY Patented Mar. 13, 1945

2,371,296

UNITED STATES PATENT OFFICE 2,371,296

MEANS FOR VENTING MILK CANS

John A. Hopwood, Great Neck, N. Y., assignor to Hopwood Retinning Co., Inc., Jersey City, N. J., a corporation of New Jersey Application June 2, 1943, Serial No. 489,345

3 Claims. (Cl. 220—44)

This invention relates, generally speaking, to cans for the delivery of milk, cream and the like to milk depots, creameries, retail stores, restaurants, etc. For milk or cream thus shipped, it is highly desirable to provide a vent in the cans. For example, if cream is stored for any length of time in a closely sealed can, it generates gaseous pressure which not infrequently blows off the top of the can and permits the contents of the can to spoil or accumulate dust and other extraneous matter. Furthermore, milk delivered to restaurants in cans of this character is frequently dispensed directly from the can through various dispensing mechanisms, some of which embody apparatus for aerating the milk to maintain an equitable distribution of cream throughout the contents of the can. Moreover, milk not infrequently contains grass and other flavors (commonly referred to in the trade as "metallic flavors") and it is desirable in practice that these be permitted to escape from the milk so as to improve the taste thereof.

In the conventional umbrella type of milk can cover, it has been heretofore the practice to provide a perforation somewhere in the cover, usually below the umbrella thereof, to permit of venting of the can for the purposes stated. Venting of a plug type cover, by merely forming a hole therein, however, is not practical in any sense for these plug type covers extend down into the neck of the can in such a manner that if a vent hole is placed in a plug type cover, dirty water or other material which not infrequently accumulate in the top of the cover will simply flow through the hole into the can and pollute the milk. Prior to the present there has been no satisfactory manner of venting a plug type cover.

The present invention is directed primarily to the venting of a can cover of the plug type and provides thoroughly sanitary and efficient means for this purpose.

In practically carrying out the present invention, the bottom plate of the plug type cover is provided in its under side with a depression or cavity which is preferably positioned centrally of the cover. From this depression a channel extends radially outward to the periphery of such bottom plate. This channel is thence carried upwardly to a point directly below and within the confines of the umbrella flange with which plug covers are generally provided. When such a cover is placed on the can, a vent channel is thus provided from the interior of the can to the exterior thereof and terminates below the umbrella flange of the cover.

Such a channel will permit the entrance or exit of air from the can, but an open channel of this kind is not desirable as there may be some tendency of the milk to slop through this channel if the can is tilted. To obviate this and also in the interests of a sanitary package, I provide a sheet of material which may conveniently be of paper. This sheet is provided centrally with a vent opening or perforation and is of greater size than the plug portion of the cover. In practice, the paper is wrapped about the plug portion of the cover with the hole in the paper registering with the central depression in the cover and the cover is then forced down into the neck of the can with the paper gripped between the can and its cover. This provides a tight cover fit with the only air outlet at the center of the cover, so that if the can is tipped, the milk will not slop out through the vent channel. Furthermore the paper will have some filtering effect to keep extraneous matter from working into the can, and thus produce a more sanitary package.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 2 is a central vertical section through the assembled construction, the section being taken in the plane of the line 2—2 of Figure 3.

Figure 3 is a bottom plan view of the cover removed from the can and with the paper omitted.

Figure 4 is an isometric view looking at the cover from the bottom side thereof, the paper being absent.

Figure 1:
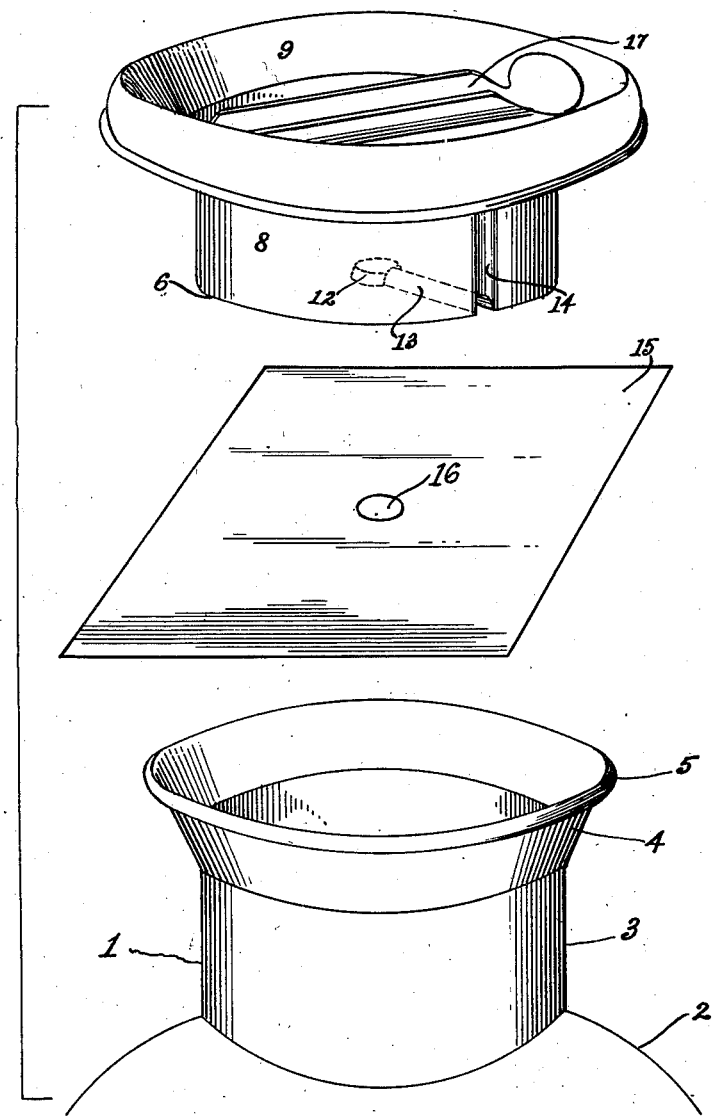
Figure 1 is a perspective view showing a plug cover and a sheet of paper embodying the present invention, together with the upper portion of a can, all shown in perspective and in dismantled relation, so as to illustrate the relation between the parts before they are to be assembled.

Referring to the drawings, I designates generally a milk delivery can formed with an appropriate breast 2, a neck 3 and superimposed bowl 4, the free edge of which is rolled as shown at 5. This is the structure of a conventional milk delivery can and is here shown merely to permit the present invention to be more readily understood.

The plug type cover embodies a plug portion 6 having a substantially flat bottom plate 7 peripherally joined to an upstanding cylindrical side wall 8, surmounted by a lip 9 which merges into an umbrella edge portion 10, the margin of which is rolled as shown at 11.

The relation between the parts of the plug top and the can are such that when the plug portion 6 of the cover is introduced into the neck 3 of the can, the lip 9 of the cover will overlie the bowl 4 of the can, while the umbrella edge 10 of the cover will overlie and overlap and extend laterally beyond the rolled edge 5 of the bowl 4 of the can. This relation is provided so that water or other extraneous material which may accumulate in the cover will not slop over and into the space between the bowl of the can and the lip of the cover and thus enter the can.

In adapting the present invention to a plug cover of the character described, the bottom plate 7 of the cover is provided on its under side with a depression or cavity 12 which may be accomplished by pressing this depression into the stock of the cover. From this depression there is also pressed into the bottom plate 7 a radial channel 13 which extends to the outer periphery of the plug portion 6 and thence upwardly in the cylindrical wall of the plug portion in a direction parallel to the axis of the cover, as shown at 14. This channel terminates at the lip 9, so as to provide a continuous channel from the depression 12 to a point above the top of the neck 3 of the can and thus above those portions of the cover and can neck which normally contact when the cover is in place on the can.

15 designates a sheet of material which may conveniently be paper although parchment or other suitable sheet material may be used for this purpose. The sheet may be of any peripheral contour, but is preferably made either round or polygonal. It is shown in the drawings as square and is sufficiently large to permit it to overlie the exterior surface of the plug portion of the cover. This sheet 15 has a central opening 16.

In assembling the parts the sheet 15 is placed beneath and wrapped about the plug portion 6 with the perforation 16 registering with the depression or cavity 12. Beyond the periphery of the bottom plate 7 the sheet is folded upwardly to overlie the exterior of the cylindrical plug portion 6 of the cover and the cover is thereupon thrust into the neck of the can with the paper between the plug portion of the cover and the neck of the can to partake of the position shown in Fig. 2. The paper 15 may be of such size that, when the parts are in assembled relation, the paper will not show around the periphery of the umbrella edge of the cover, although this is not important because it may extend an appreciable distance exteriorly of the assembly without any harm. In fact in some cases it is desirable to have it do so, to indicate to the inspector that the can has been properly sealed. If the paper does extend exteriorly of the assembly, the rolled edge 11 of the cover will force the extending portion in a downwardly inclined direction, so that any liquid falling on top of the can or on the paper will be shed exteriorly of the can and will not be guided thereby into the space between the can and its cover.

When the parts are assembled as described, the paper will close the outer open side of the channels 13 and 14 in the cover plug, but provide a free passage for air through the opening 16 and through said channels to the exterior of the can. The paper will, however, be shirred or pleated where it passes upwardly between the adjacent cylindrical walls of the cover plug and can neck and will have a filtering action upon the air which enters into the upper end of the channel 14 and thus trap any dust which might otherwise possibly be drawn into the can by air passing through the channels in a retrograde direction. The paper will also act as a cushion between the can and the cover which will facilitate a tight fit between these parts and also permit the cover to be readily removed by an upward pull on the handle 17, when desired. The paper is adapted for a single use and a new piece of paper is inserted whenever the can is refilled.

In practice, the venting of the can, as hereinbefore described, permits the ready exit of pressure which may be generated in the can because of any of the conditions hereinbefore referred to as, e. g., air agitation of the milk, the escape of animal or grass flavors or generated gases from cream in storage. Retrograde flow of air into the can, to preclude the building up of vacuums in the can, will also be permitted where milk is drawn from the can while the cover is on, as in certain dispensing devices well known to the trade. The invention fulfills a long felt want in the trade and it does this in a very simple, economical and efficient manner.

The invention may be readily adapted to standard cans by simply modifying the plug portion of the cover by the provision therein of the vent channels and the central depression to which I have referred. The paper employed as specified may be of an economical grade, preferably of soft texture, but sufficiently tenacious to withstand use.

The foregoing detailed description sets forth the invention in its preferred practical form, but the invention is to be understood as commensurate with the appended claims.

Having thus fully described the invention, what I claim as new and desire to secure by Letters Patent is:

1. In an assembly of the character described, wherein a plug cover provided with a plug portion is adapted to fit into the neck of a milk delivery can; a depressed channel formed in the under side of the bottom plate of said plug portion and extending to the periphery of said bottom plate and joining a depressed channel extending upwardly along the lateral wall of said plug portion to a point above those portions of the cover and the can which normally contact when the plug cover is in place on the can, in combination with a perforated sheet underlying the bottom plate of the plug portion of the cover with the perforation in the sheet in registration with the channel in said bottom plate and with the sheet extending upwardly beween the interfitting portions of the plug cover and the can.

2. In an assembly of the character described, wherein a plug cover provided with a plug portion is adapted to fit into the neck of a milk delivery can; a central depression in the under side of the bottom plate of said plug portion, and a vent channel leading from said depression to the periphery of said plug portion and thence upwardly along the lateral wall of said plug portion to a point above those portions of the cover and can which normally contact when the parts are assembled, in combination with sheet material underlying the bottom plate of said plug portion and extending upwardly between the interfitting portions of the plug cover and the can, said sheet material having an opening substantially registering with said central depression of the cover.

3. A plug cover for a milk delivery can of the kind which is provided with a plug portion closed at its bottom by an imperforate bottom plate and the side wall of which plug portion is extended upwardly to form a lip having an umbrella edge, the improvement which comprises: a vent channel formed in the bottom face of the bottom plate and extending from substantially the center of said bottom plate to the periphery thereof and there connecting with a vent channel formed in the outer face of the plug portion and extending upwardly in the outer face thereof to the base of said lip.

JOHN A. HOPWOOD.